United States Patent [19]

Yang

[11] Patent Number: 5,076,215

[45] Date of Patent: Dec. 31, 1991

[54] AUTOMATIC TIMING DEVICE OF SPRINKLING FISH MEAL FOR FISHPOND

[76] Inventor: Ning C. Yang, No. 12, Kuan Chung Rd., Chien Chen Dist., Kaohsiung, Taiwan

[21] Appl. No.: 640,826

[22] Filed: Jan. 14, 1991

[51] Int. Cl.⁵ .............................................. A01K 61/02
[52] U.S. Cl. ..................................... 119/51.04; 119/3
[58] Field of Search ................. 119/51.4, 3, 51.01, 119/51.04

[56] References Cited

U.S. PATENT DOCUMENTS

| | | | |
|---|---|---|---|
| 3,477,407 | 11/1969 | Loudon | 119/51.04 |
| 3,528,588 | 9/1970 | Moore | 119/51.04 |
| 4,372,252 | 2/1983 | Lowry | 119/51.04 |
| 4,799,459 | 1/1989 | Yi-Tung | 119/51.04 |
| 4,984,536 | 1/1991 | Powell et al. | 119/51.04 |

FOREIGN PATENT DOCUMENTS

| | | | |
|---|---|---|---|
| 966026 | 4/1975 | Canada | 119/51.04 |
| 7503893 | 10/1976 | Netherlands | 119/51.04 |
| 1464990 | 3/1989 | U.S.S.R. | 119/51.04 |

*Primary Examiner*—John G. Weiss
*Attorney, Agent, or Firm*—Fleit, Jacobson, Cohn, Price, Holman & Stern

[57] ABSTRACT

An automatic feeding device for sprinkling fish meal into a fishpond uses a ship, which moves along a designed track, has a blower which sprinkles fish meal quantitatively into the fishpond.

3 Claims, 6 Drawing Sheets

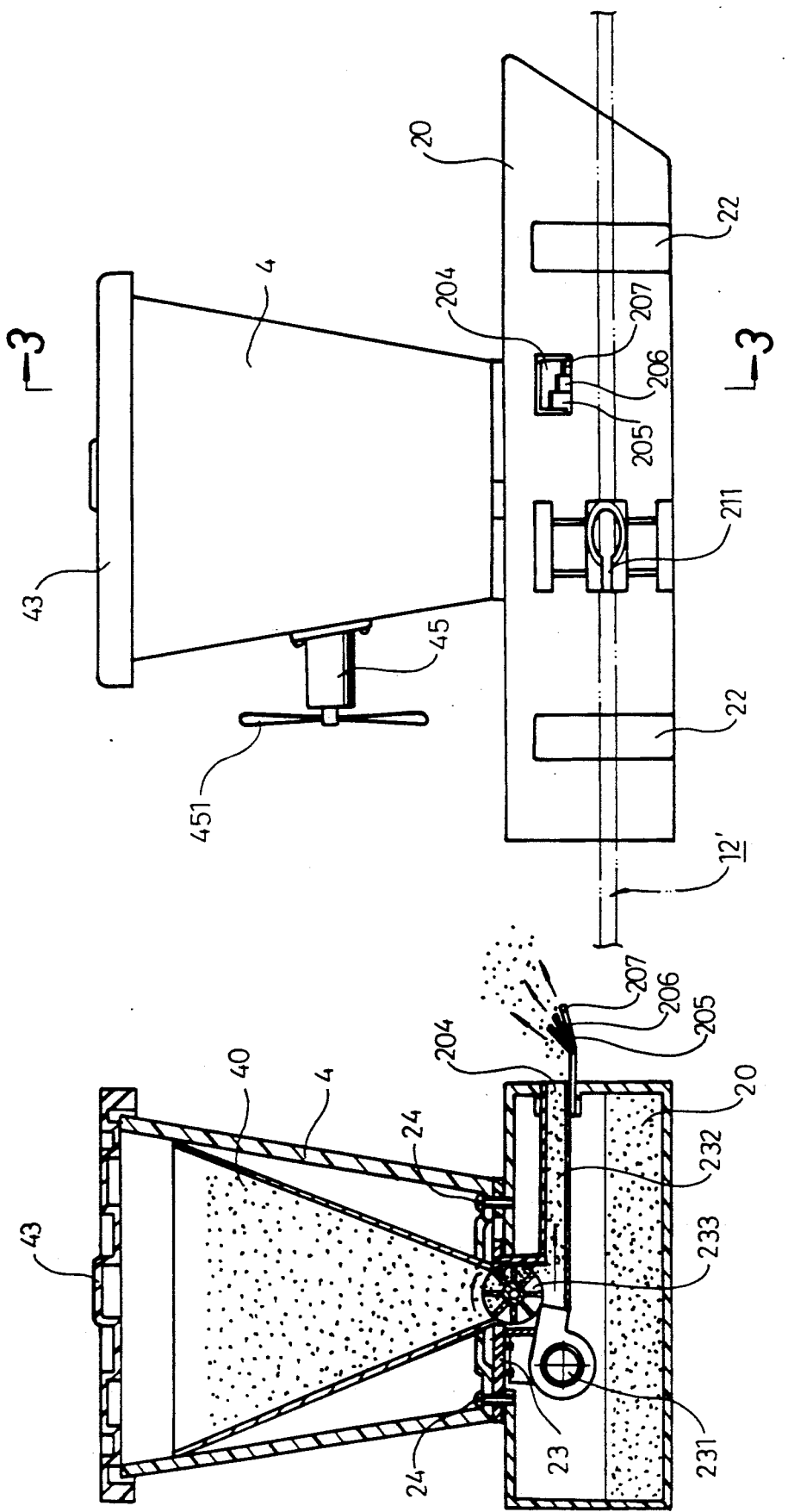

AUTOMATIC TIMING DEVICE OF SPRINKLING FISH MEAL FOR FISHPOND

BACKGROUND OF THE INVENTION

This invention relates to an automatic feeding device for sprinkling fish meal in an artificial fishpond. In order to promote growing conditions for fish and shrimp in an artificial fishpond, fish meal in set quantities must be thrown into a fishpond periodically. Fish meal is wasted and water quality decreased if fish meal is overdone. The conventional way of adding fish meal was to have persons carry a barrel filled with fish meal along a fishpond's edge and sprinkle fish meal into the fishpond. If the area of the fishpond was large, persons would have to take a plastic raft to sprinkle fish meal around the different corners of the fishpond. Hence, this method of sprinkling fish meal wasted manpower. Furthermore, working conditions were frustrated by inclement weather.

SUMMARY OF THE INVENTION

The object of this invention is to provide an automatic feeding device for sprinkling fish mean for the feeding of fish and shrimp in an artificial fishpond. This device will sprinkle fish meal automatically and in set quantities into a fishpond along the designed route when a timer reaches a certain setting time. As a result of this automation, human efforts are saved.

Another object of this invention is to sprinkle fish meal uniformly into a fishpond and to avoid uneven sprinkling.

BRIEF DESCRIPTION OF THE DRAWINGS

FIG. 3 is a cross-sectional view taken along line 3—3 of FIG. 4;

FIG. 4 is a side view of ship in this invention;

DETAILED DESCRIPTION OF THE INVENTION

Figure 1:
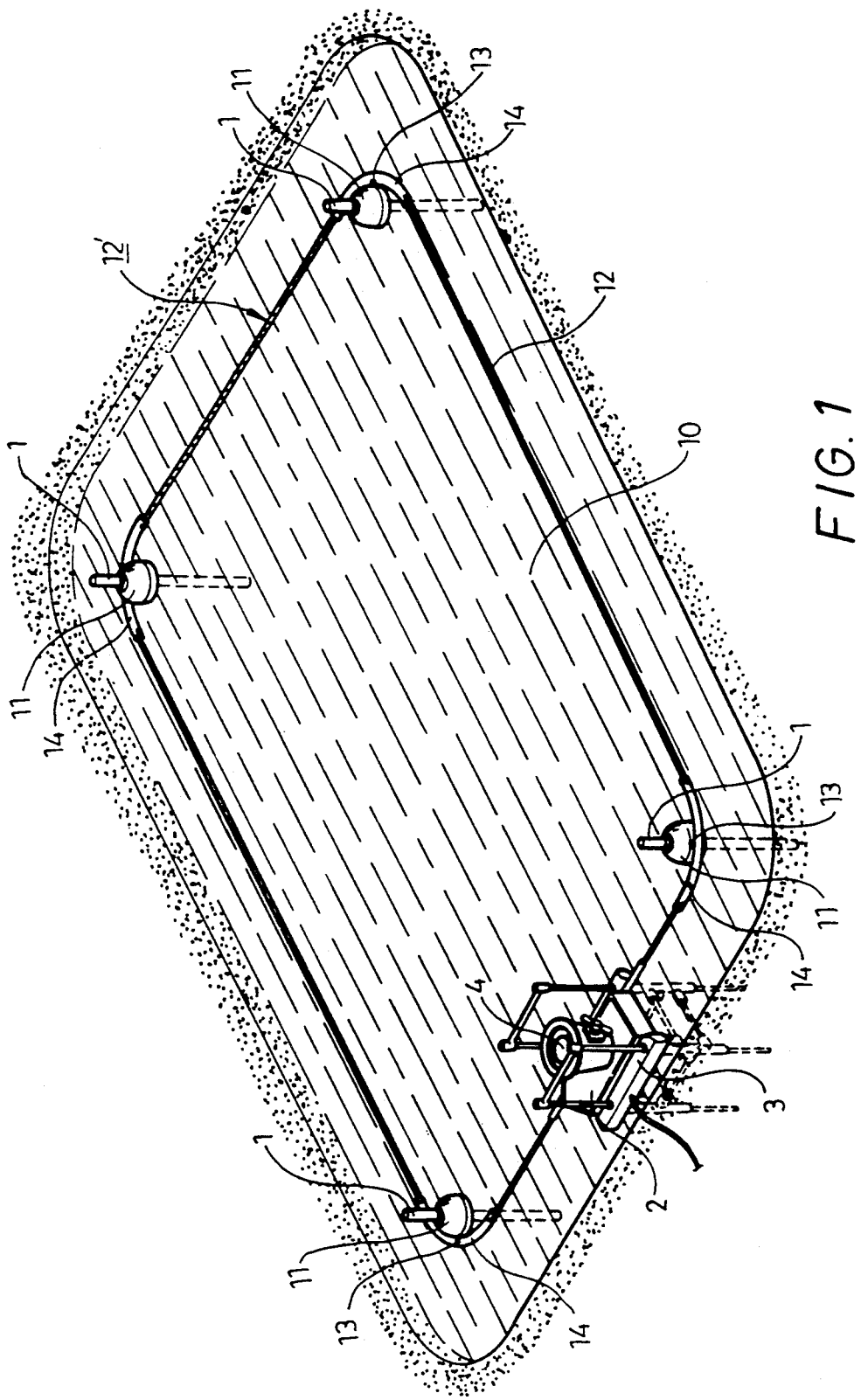
FIG. 1 is a solid view of the invention.

First, referring to FIG. 1, this is one example of this invention, but the application of this invention will not be limited to only this example. This invention will now be described in detail with FIG. 1 as a basis:

According to the area of fishpond 10, numbers of poles 1 are erected above water level in suitable places of fishpond 10. Buoys 11 mounted on poles 1 rise or fall automatically depending on the change of water level so that buoys 11 keep the position above water level.

Figure 7:
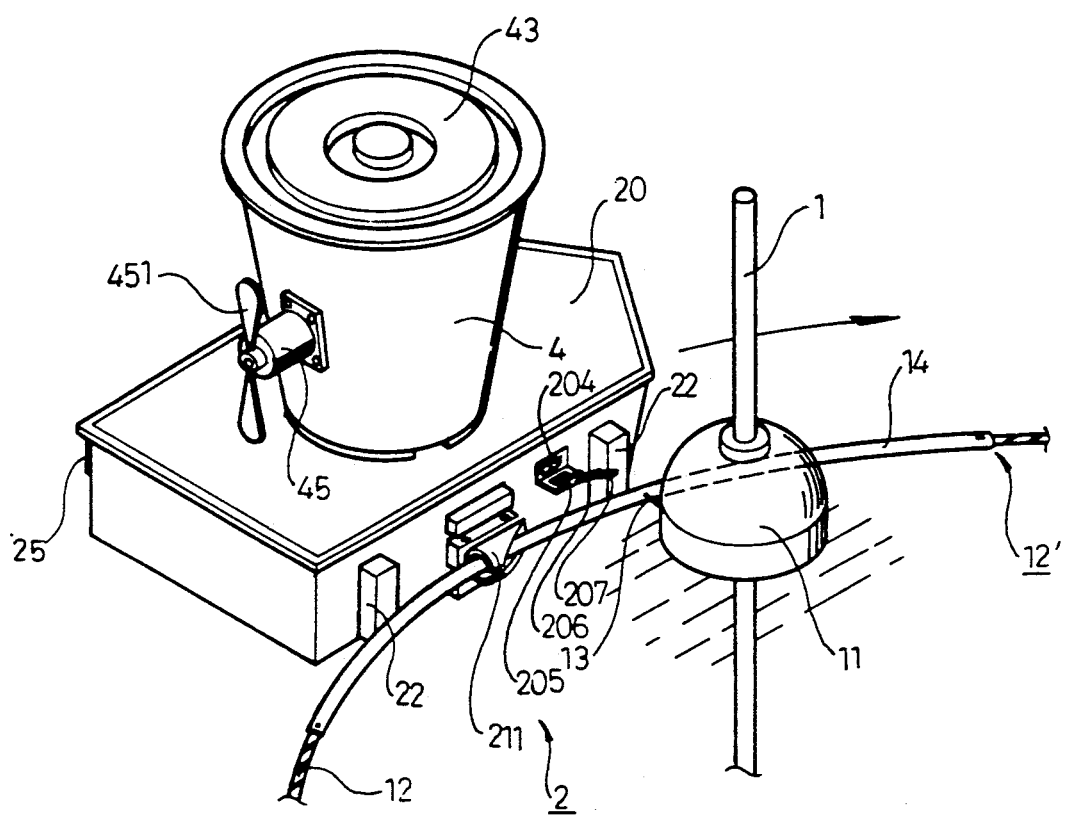
FIG. 7 is an actional view of ship turning a corner.
Figure 8:
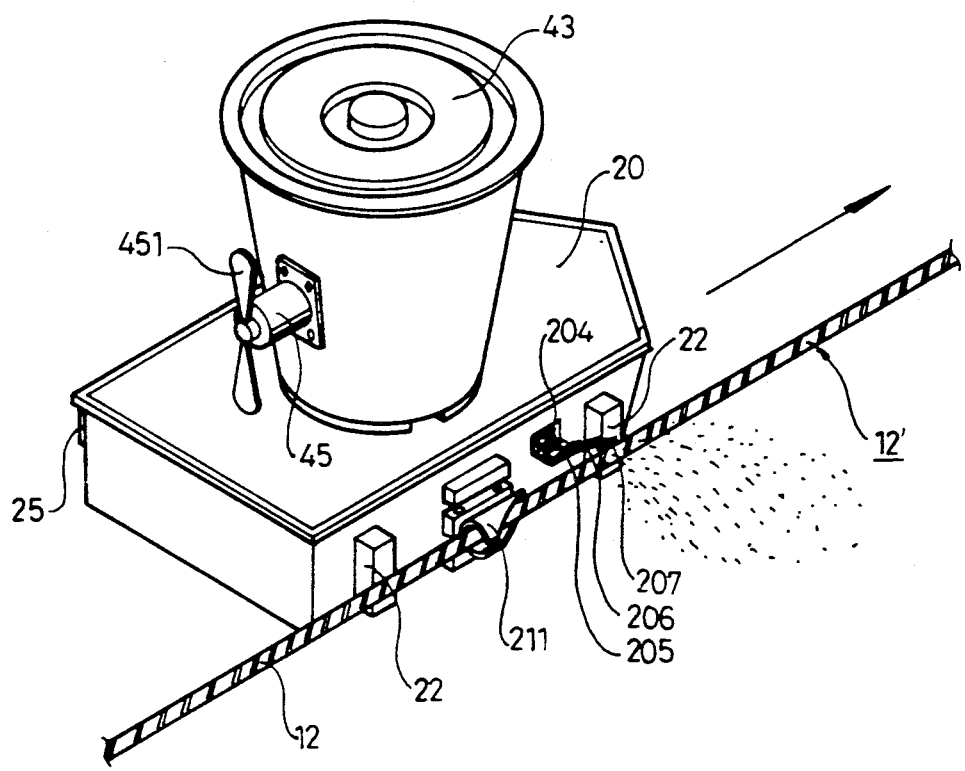
FIG. 8 is an actional view of ship going straight.

Buoys 11 are connected by nylon rope 12 to form a circulated track 12' which provides a route for ship 2, as shown in FIG. 8. Hence, the track 12' can be designed circulating along the edge of fishpond 10 as shown in FIG. 1, or can be designed to form the N-shape or the W-shape, etc.. The one necessary condition for that kind of track 12' is that it must be a circulated track. In order to let ship 2 go smoothly through the outer turning corners of buoys 11, we use tiny pillars 13, as shown in FIGS. 1 and 7, to connect curvy tracks 14 which can be made of plastic tubing. The curvature of tracks 14 whose two ends connect with rope 12 depends on the different design of track 12'. Hence, ship 2 can go smoothly along track 12' no matter whether the track is square shaped, N-shaped, or W-shaped 12'.

Figure 2:
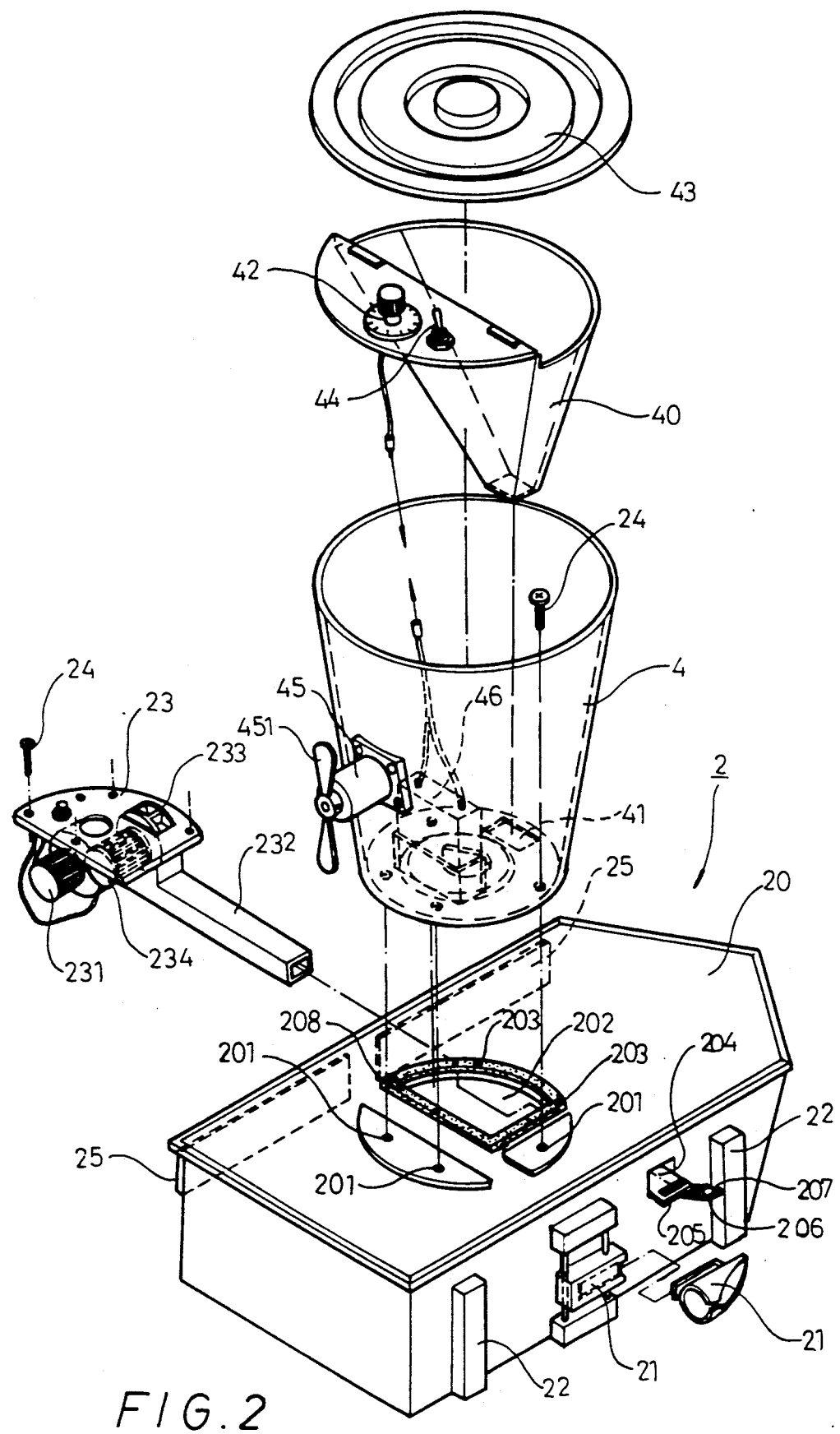
FIG. 2 is an exploded perspective view of the ship in this invention.
Figure 9:
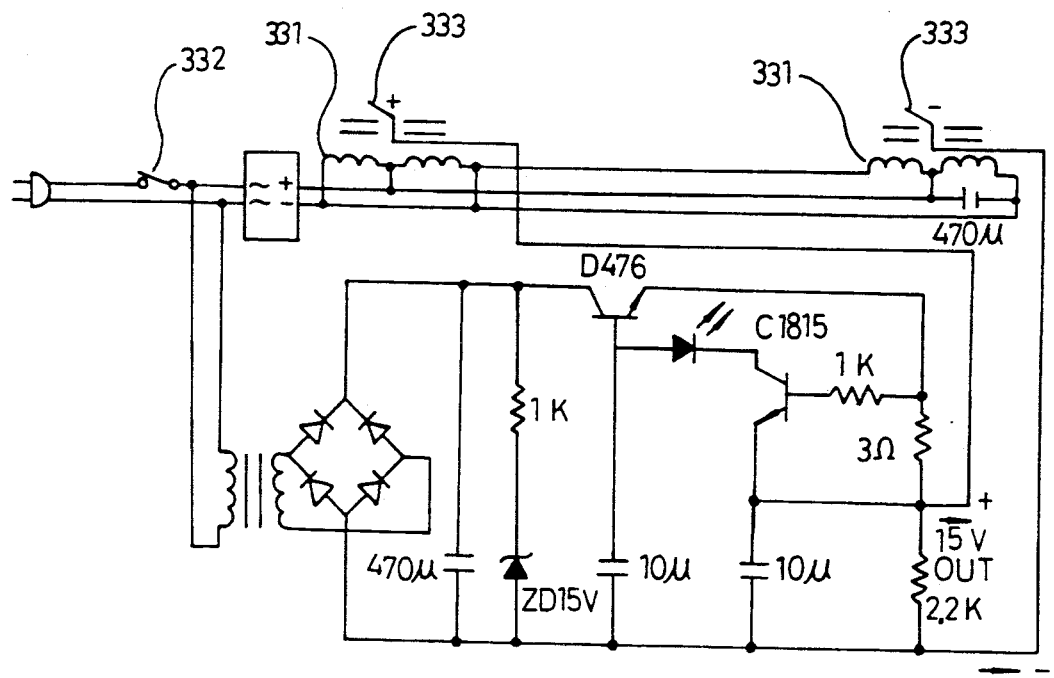
FIG. 9 are the diagrams of the electromagnetic steel circuit and the charging circuit in this invention.

Referring to FIG. 2, ship 2 consists of a ship hull 20. A fastener 21 located at one side of ship hull 20 is to install a hook 211. By mounting on track 12', hook 211 can move along track 12' which is in parallel with the center of ship 2. Two juts 22 located the front and the rear of fastener 21 contacts track 12' to stablize the ship 2. Two electrode plates 25 are located in another side of ship hull. Electrode plates 25 receive the voltage contacts 333 of charging circuit from dock 3 and the attraction of electromagnetic contact 331, as shown in FIG. 9, to berth ship 2 into dock 3 and charge automatically. The top of ship hull 20 is a flat surface which has bolt holes 201 to mount with storage barrel 4, and has a sector hole 202 with bolt holes 203 to combine base plate 23 with screws 24. Hence, the base plate 23 is mounted between storage barrel 4 and ship hull 20, as shown in FIGS. 2, 3, and 4. In order to have a better sealed effect,(to prevent rainwater leaking), between base plate 23 and ship hull 20, antileak washer 208 is added at the perimeter of sector holes 202. The blower motor 231 is mounted under base plate 23. When the blower motor 231 turns, the air will blow out from guided way 232 whose end is located at the aperturee 204 of ship hull 20. Three plates 205, 206 and 207 with different inclination are located at the aperture 204. Hence, the air can blow in three different angles and project fish meal to different distances. Base plate 23 has a dent to protrude driving wheel 233. The bottom of storage barrel 4 has a dent to engage with driving wheel 233. Driving wheel 233 is driven by reduced speed motor 234 which is controlled by adjust knob 42. By tuning adjust knob 42, driving wheel 233 has different speed so that fish meal can be controlled quantiatively to drop at guided way 232. Then blower motor 231 blows fish meal out from the window 204 of ship 2.

Storage barrel 4 is mounted on ship hull 20 by bolts 24. There is a funnel 40 filled with fish meal inside storage barrel 4. The lower end of funnel 40 engages with a hole 41 of storage barrel 4. Hence, fish meal can drop through hole 41 to driving wheel 233. Storage barrel 4 includes a cover 43 to prevent water entering funnel 40. An adjust knob 42 located above funnel 40 is used to adjust the speed of reduced speed motor 234. Switch 44 is to used control the power supply of every motor. Motor 45 having fan propeller 451 mounted on a rotating shaft is fixed at the outside of storage barrel 4. When power switches on to start motor 45, fan propeller 451 rotates synchronously and propels ship 2 forward along track 12' in a cruising speed. Driving wheel 233 controls fish meal quantiaively to drop into the guided way 232. The air driven by blower motor 231 blows fish meal to hit three plates 205, 206, and 207 with different inclination, and to project fish meal into fishpond in different angles.

Figure 5:
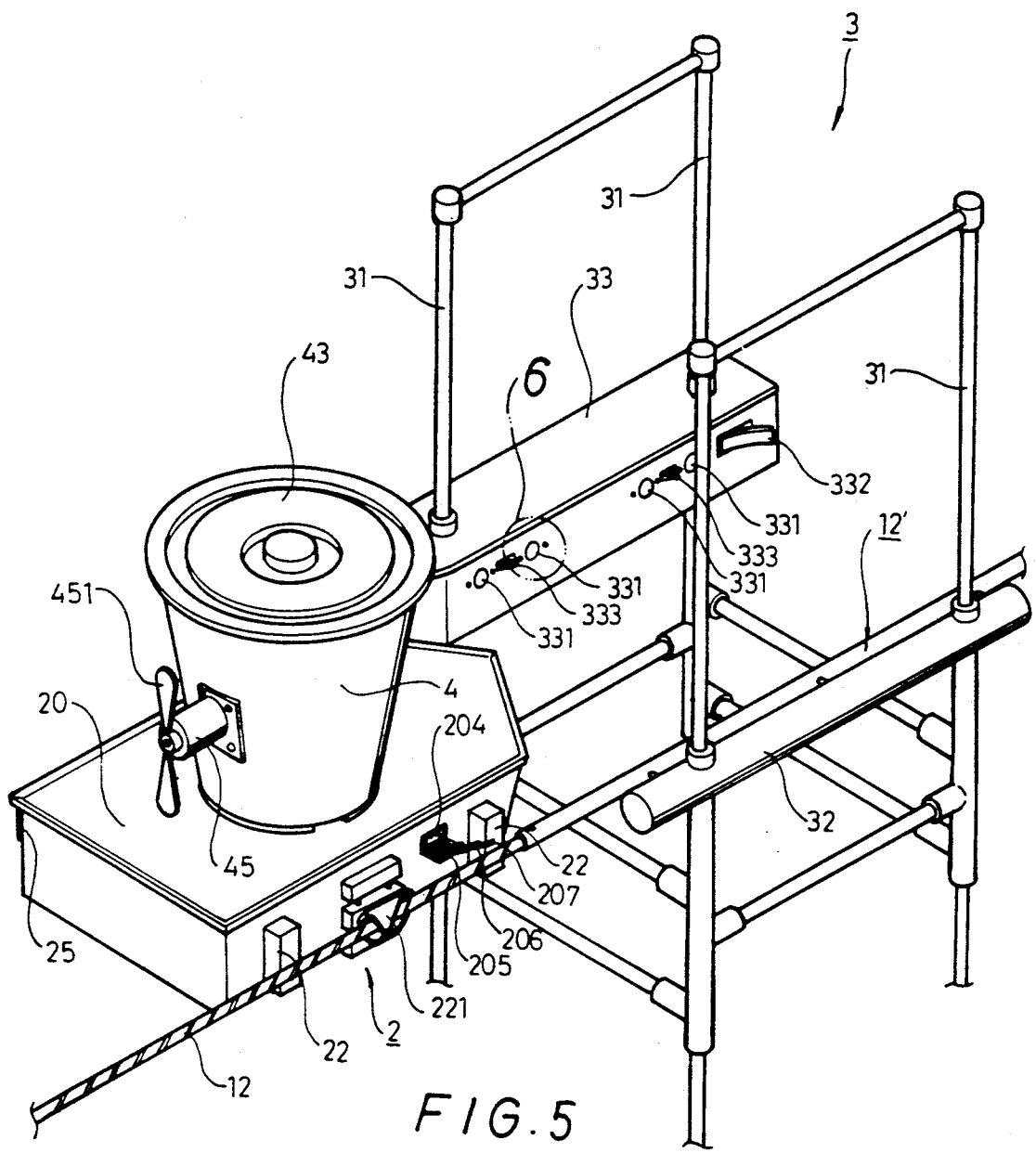
FIG. 5 is a solid view of ship and shipyard in this invention.
Figure 6:
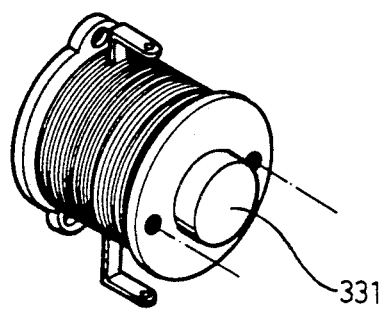
FIG. 6 is an enlarged solid view of place 6 of FIG. 5.

Referring to FIG. 5, dock 3 installed at the edge of fishpond is used to anchor ship 2. Support brackets 31 located at both sides of dock 3 installs a buoy 32 and a box 33 floatable above water level. Plastic track 12' connected by plastic rope 12 is located at the inner side of buoy 32. An exterior face of box 33 has an electromagnetic contact 331, a limit switch 332, voltage contacts. Charging circuitry, as shown in FIG. 9, in contained inside the box. When ship 2 enters into dock 3 and touches limit switch 332, electromagnetic 331 is excited by conducting current to attract electrode plates 25 of ship 2 so that ship 2 can be anchored in dock 3. By connecting voltage contacts 333 with the electrode plates 25 of ship 2, the storage battery 46 of ship 2 starts charging.

Figure 10:
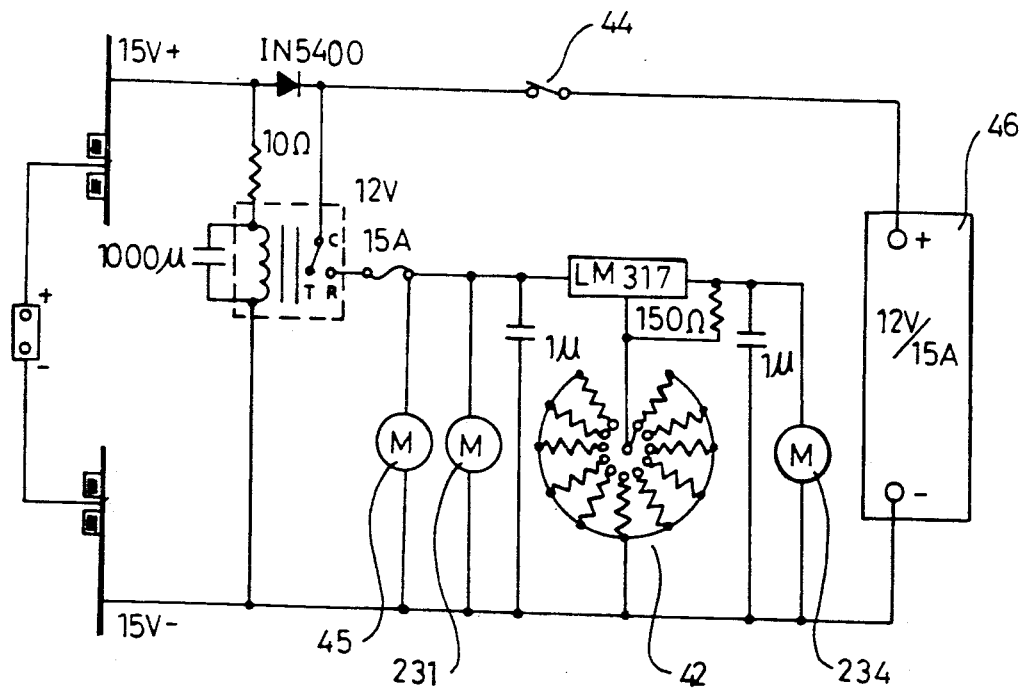
FIG. 10 is the control circuit of every motor used in this invention.

FIG. 9 depicts the charging circuit in accordance with this invention. During the "ON" time which is set by timer, electromagnetic contact 331 is excited to attract ship 2 right after limit switch 332 is closed. The charging voltage goes from the output of charger through voltage contacts 333 and electrode plates 25 to storage battery 46, as shown in FIG. 10. The relay of motor control circuit is excited by charging current to close contacts C & T so that every motor in ship 2 stops running. When timer reaches the "OFF" time, electromagnetic contact 331 demagnetizes to separate ship 2 from box 33. Simultaneously, the contacts C & T are open and the contacts C & R are closed. Each motor of ship 2 starts running. Ship 2 leaves dock 3 and moves along track 12' to sprinkle fish meal into fishpond. The speed of reduced speed motor 234 is adjusted by tuning the variable resistance of step switch 42 to control the amount of fish meal sprinkling into fishpond.

What is claimed is:

1. An automatic feeding device for sprinkling fish meal into a fishpond comprising a track, a ship and a dock;

said track comprising poles erected in the fishpond, floatable buoys, which can rise or fall, mounted on said poles, said buoys being connected by a rope to form said track;

said ship comprising a ship hull which has a fastener at one side to install a hook, said ship movable along said track by said hook mounted on said track, two electrode plates being located in another side of said ship hull;

said ship hull having an aperture with plates of different inclination at its bottom, said ship hull having bolt holes to mount with a storage barrel and a sector hole to mount with a base plate which is mounted between said storage barrel and said ship hull, a blower motor located under said base plate blowing the air out from a guided way whose end is located at said aperture, said base plate having an opening engageable with a hole in said storage barrel, a driving wheel being driven by a reduced speed motor in said hole, said driving wheel capable of driving fish meal contained in said storage barrel into said guided way, said blower motor capable of blowing fish meal out of said aperture;

said dock installed at an edge of the fishpond being provided to anchor said ship, support brackets located at both sides of said dock installing a buoy and a box, said track being located in an inner side of said buoy, said box having an electromagnetic contact, a limit switch and voltage contacts with internal charging circuitry; and said storage barrel having said hole at its bottom to engage with said driving wheel of said base plate, said storage barrel having a funnel for containing said fish meal such that said fish meal can drop from the bottom of said funnel through said hole to said driving wheel, said storage barrel having a switch at its top to control a power supply to the reduced speed motor, said blower motor and a fan motor, said storage barrel having a storage battery inside and said fan motor with a fan propeller outside.

2. The automatic feeding device as claimed in claim 1, wherein said reduced speed motor is adjustable to control the amount of fish meal sprinkling into fishpond.

3. The automatic feeding device as claimed in claim 1, wherein outer turning corners of said track are rigid plastic curves connected with said rope to form said track.

* * * * *